N° 96755
*C. D. Williams' & W. H. Nobles'*
Process for Reducing Ores
PATENTED
NOV. 9 1869
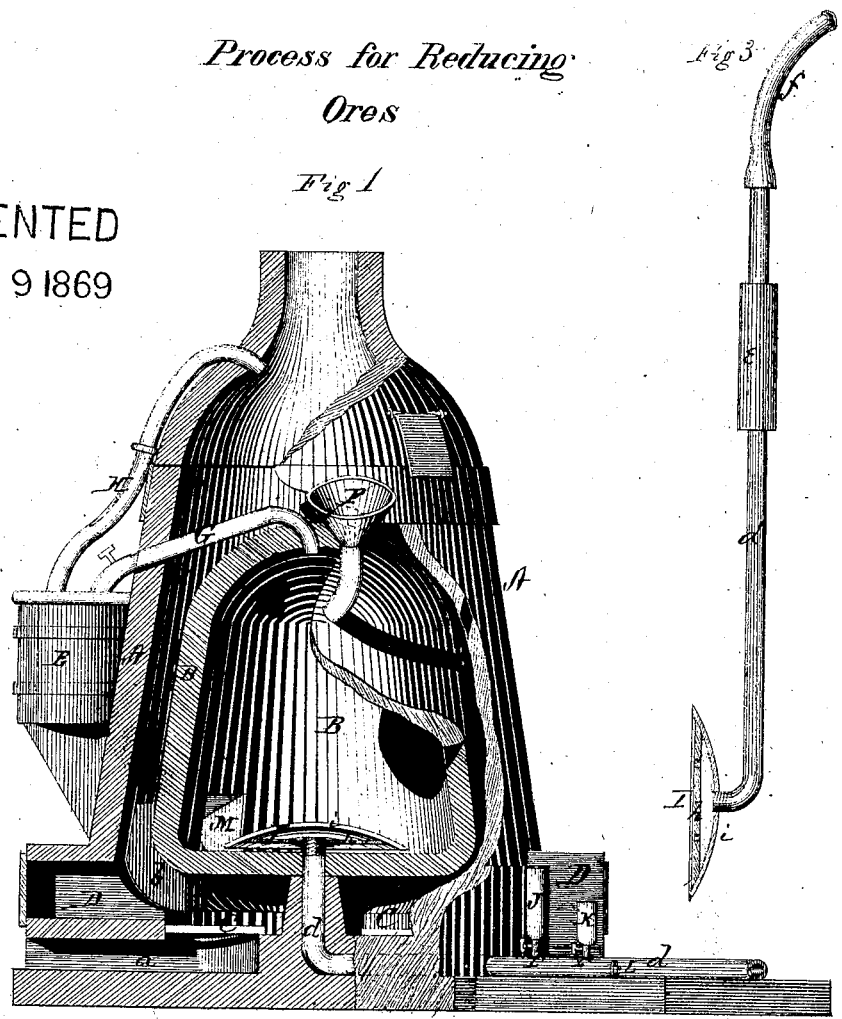
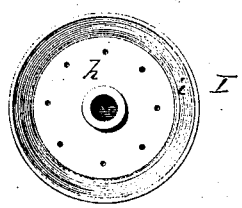
Witnesses:
Harry King
C. L. Overt
Inventor:
C. D. Williams
W. H. Nobles
per
Alexander H. Mason
Atty.

UNITED STATES PATENT OFFICE.

CHARLES D. WILLIAMS AND WILLIAM H. NOBLES, OF SAINT PAUL, MINNESOTA.

Letters Patent No. 96,755, dated November 9, 1869.

IMPROVEMENT IN REDUCING ORES.

The Schedule referred to in these Letters Patent and making part of the same

*To all whom it may concern:*

Be it known that we, CHARLES D. WILLIAMS and WILLIAM H. NOBLES, of Saint Paul, in the county of Ramsey, and in the State of Minnesota, have invented certain new and useful Improvements in Process for Reducing Ores; and do hereby declare that the following is a full, clear, and exact description thereof, reference being had to the accompanying drawings, and to the letters of reference marked thereon, making a part of this specification.

The nature of our invention consists in a new process for reducing ores, and in the construction and arrangement of the furnace and retort by which our process is carried out.

In order to enable others skilled in the art to which our invention appertains, to make and use the same, we will now proceed to describe the construction of the furnace and retort, and the process by which the ore is reduced, referring to the annexed drawings, in which—

Figure 1 is a longitudinal vertical section of the furnace;

Figure 2 is a bottom view of the stirrer or gas-generator, used in the furnace; and Figure 3 is a side view of the hand gas-generator.

The furnace and retort being very simple in their construction, we will only, by letter, designate the different parts, and then, while describing the process, somewhat enlarge on the same.

A represents the furnace, within which the retort B is placed.

C C are the fire-places for heating the retort, which fire-places are four in number.

D D are the entrances to the fire-places C C.

E is the reservoir or receptacle of the gases, precipitating-fluids, and mercury, after passing through the retort.

F is the funnel and spout, through which the ores pass into the retort.

G is the pipe that conveys gases, sulphur, &c., from the retort B to the receptacle E.

H is the pipe that conveys gases, sulphur, &c., not deposited, and remaining in reservoir E, into the chimney of the furnace, and thence into the open air.

*a a* are the air-holes under the grates, being four in number, the same as the fire-places.

*b b* are supports for the retort B.

I is the stirrer or gas-generator.

*d* is the pipe conveying steam from the boiler to the stirrer or gas-generator.

*e* is the wooden portion of the pipe *d*.

*f* is the rubber pipe that connects the pipe *d* with the boiler.

*h* is the bottom plate of the stirrer or generator I, having notches or perforations, so that when the materials for making hydrogen, chlorine, and other gases, are conveyed into the stirrer or generator, through the pipe *d*, and there decomposed, to form gas, the said gases, or accompanying steam, may pass through these notches or perforations at the bottom of the retort, and ascend up through the ores.

*i* is the upper plate, or roof of the stirrer or generator, and is used to protect the space in which the gas is formed from filling with pulverized ores.

J is the reservoir for substances containing chlorine and other gases.

K is the reservoir for mercury to be used in vaporizing mercury, and distribution among the ores.

L, L¹, and L² are stop-cocks, used for controlling steam, chlorine solution, and mercury M M are two openings in the retort B, for the discharge of the ores after they have been manipulated.

One of the main features in the construction of our furnace is the stirrer or gas-generator I, for the purpose of using gas, for agitating and stirring metallic ores while being roasted.

The stirrer or gas-generator consists of a lower plate, *h*, of a concavo-convex surface, or of a flat surface, either round, semicircular, square, oblong, or any other shape, having an upper plate, *i*, of the same shape, which may be concavo-convex or flat. The lower plate *h* may be less concavo-convex or flat, to admit the steam, or materials for hydrogen, or other gases, between the two plates, in sufficient quantities to saturate or permeate the ores, through perforations or holes in the bottom plate, or notches in the edge of the same.

If the plate is concave, the concave of the stirrer or generator is to be turned down, the edges fitting the bottom of the furnace, leaving a space or area between the bottom of the retort, directly under the ores, and is so constructed as to be used by hand, and moved from one part of the retort to another, the steam entering through the handle, which is hollow. Through this hollow handle *d* the hydrogen, chlorine, or steam, or other materials for gases, pass to and under the ores.

Or the stirrer and generator I may be stationary, as represented in the drawings, and the pipe *d* conducts the fluid, composed of the gases to be used, or from generators, the gas, as above stated. The stirrer or generator may also be used without a bottom plate.

The operation of said stirrer is as follows:

The steam is passed through the pipe *d*, a part, *e*, of which is composed of wood, or metal, or any other material that may be used as a non-conductor of heat, so it may be conveniently handled.

The effect of thus introducing the steam and gases from the bottom instead of from the top of the ores downward, causes them to permeate the whole masses of the ores.

The stirrer or generator being first heated, by being introduced under the ores, and by the steam admitted into it, and, secondly, by the bottom of the retort being intensely heated, in contact with the stirrer or generator, the heat decomposes the water of the steam at the bottom of the retort, thus setting free hydrogen-gas and oxygen-gas, the oxygen being promptly burned up, while the hydrogen unites with the sulphur in the ores, and forms sulphuretted hydrogen-gas, which passes away through the pipe G, connected with the retort, into a reservoir, E, containing mercury and a precipitating-fluid, and from thence, with any free sulphur that may escape in the form of vapor, through the pipe H, therewith connected, into the chimney and open air, as may be desired.

The chlorine solutions are forced by steam-pressure, and introduced into the stirrer or generator, under the ores, at which point they are decomposed by intense heat, and the gases of which the solutions are composed are set free, after or along with the desulphurization of the ores, in the same manner as above described for introducing steam or hydrogen-gas, thus forming chlorine-gas under the stirrer or in the generator, from muriatic acid or saturated solutions of chloride of soda in water, or other soluble substances containing chlorine-gas, and thus chlorize the metals contained in the ores, from the bottom upward, through the mass of ores, instead of from the top of the ores downward, as is usually attemped to be done and practised.

Forming or setting free chlorine-gas at the bottom of the ores in the retort, along with steam or hydrogen-gas, or soon after desulphurization, hastens and perfects both the complete desulphurization of the ores, and the chlorization of the precious metals contained in them.

The effect of introducing muriatic acid or saturated solutions of chloride of soda, or other substances containing chlorine-gas, under the heated ores, by the use of the stirrer or generator, in the manner heretofore described, is to decompose the water it or they contain, and thus set free oxygen, hydrogen, and chlorine-gases.

The chlorine thus set free unites with the metals contained in the ores, and forms them into chlorides, at the same time the hydrogen unites with any remaining sulphur in the ores, and, as above stated, converts it into sulphuretted hydrogen-gas, which is disposed of as above described.

It is found that chlorine-gas expands, and loses its specific gravity, when heated, in proportion to its expansion, and that when so heated, it becomes lighter than atmospheric air. Hence, when applied over the top or surface of the ores, it does not descend into them, or permeate the mass to which it is applied to any considerable extent, as is necessary to fully chlorize the same with certainty, and economically. Therefore, when chlorine-gas is so applied from the top, the metals are only in part chlorized.

The stirring of the ores by means of gas or steam, through the arrangement of the stirrer or generator, has not heretofore been practised.

The stirrer or generator has also another merit and novel feature, as well as advantage over any other device hitherto known for agitating the ores while being roasted, viz, that when used stationary in the retort, no doors or other apertures in the retort are to be opened, so that gases, nor steam, nor mercury used in the furnace or retort, for the purpose of reducing ore, cannot escape, to annoy or injure the health of the workmen, nor cause expense to replace the gases.

It will be observed that the peculiar construction and arrangement of the stirrer or generator is such that the ores cannot fall into and fill up the small perforations or notches, through which the steam or gases escape to the ores contained in the retort.

It will also be observed that the retort is submerged in flames in this arrangement of the furnace and retort, and the fire-places so constructed as to heat all parts of the furnace equally.

We have adopted the shape of the furnace shown in the drawings, because it is best adapted to this process; but any shaped furnace can be used that will admit a body of ores over the stirrer and generator, so that the pressure of gases upward will be disseminated through the entire mass of the ores in the retort.

The stirrer or generator may be made of any material that is indestructible by heat or the gases, and the pipe leading to said generator can be inserted in the top or sides, as well as the bottom.

This pipe $d$, and the generator, may be lined inside with platinum, or made of any material that will not be destroyed by the acid, from the point where the reservoir K enters to the generator.

For reducing fractious ores, for desulphurizing, or chlorizing, or fumigating the ores with mercury, the heat should be equal over and through the whole surface of the retort.

When chlorine and hydrogen-gases are produced, and mingled in the dark, they do not unite; but if mingled in sunlight, they gradually combine. In the dark, chlorine is passive; in the sunlight, or its equivalent, it becomes active. Now, our improvement in its use is that we hold the chlorine, in its combination with other substances, until they reach the point where chlorine-gas is to be used, viz, in the stirrer or gas-generator, directly under the ores, where they are thrown on to the red-hot bottom of the retort, and are set free from those combinations by the decomposition of them by intense heat, and which furnishes at the same moment artificial light, to render its properties active.

It will be seen, from this statement of our use of chlorine-gas, that we can use it in the night as well as in the midst of sunshine; also in cloudy weather, as in the brightest daylight.

The advantages of our process are, it saves an extra apparatus in which to make the gases; it dispenses with the use of costly chemicals; it avoids the necessity of losing the gases in their transmission to the bottom of the ores; and it prevents their escape into the room, thereby becoming destructive to the lives of the workmen, as both hydrogen and chlorine are irrespirable and destructive to human life.

It will be seen, from the above, that we use hydrogen-gas first, and by itself, for desulphurization, and to stir or agitate the ores, and leave them in condition for the ready passage through them of the chlorine. For this purpose intense heat is needed.

When the ores are desulphurized by the hydrogen, we then set free, and ready to act, the chlorine, which, accompanied by the hydrogen-gas, derived from the chlorine-solution, serves as a conductor to the chlorine.

In reducing fractious or sulphuretted ores, we may desire to use the hydrogen-gas and chlorine-gas separately.

It will be seen, by the construction of the furnace and retort, the largest amount of heat will be had at a point on the bottom of the retort, near the edges of the stirrer or generator, where the gases are evolved or set free.

To keep the gases separate, when desired, it is only necessary to change or modify the degrees of heat applied under the bottom of the retort.

It will also be seen that we use steam, for the purpose of forcing the chlorine-gas solutions, and materials containing it, as well as other gases, into the stirrer or generator, where, first, the steam is converted into hydrogen-gas; second, where the chlorine is set free by decomposition, by heat, of the chlorine-solutions, &c.; and, third, where the mercury is vaporized, by throwing them from the stirrer on to the bottom of the retort.

The hydrogen being the lightest, most readily and promptly permeates and passes through the ores, thus preparing the way for the chlorine-gas and vaporized mercury to follow.

The desulphurizing and chlorizing are done first. The mercury is introduced afterward, for the purpose of general dissemination through the ores, and securing any non-chlorized or free precious metal that may have escaped chlorination.

Having thus fully described our invention,

What we claim as new, and desire to secure by Letters Patent, is—

1. The stirrer or generator I, constructed as described, to be worked by hand, or stationary, substantially as and for the purposes herein set forth.

2. The furnace A and retort B, constructed as described, for desulphurizing metallic ores and chlorizing the precious metals, substantially by the means and in the manner herein set forth.

3. The application of an artificial light in the bottom of the retort containing the ores, for the purpose of increasing the action of the chlorine-gas, and rendering it more effective in chlorizing metallic ores, substantially as set forth.

In testimony that we claim the foregoing, we have hereunto set our hands, this 16th day of August, 1869.

CHARLES D. WILLIAMS.
W. H. NOBLES.

Witnesses:
J. P. ALLEN,
MICHEL HOULL.